United States Patent
Wang et al.

(10) Patent No.: US 11,762,429 B1
(45) Date of Patent: Sep. 19, 2023

(54) HINGED WEARABLE ELECTRONIC DEVICES

(71) Applicant: Apple Inc., Cupertino, CA (US)

(72) Inventors: Paul X. Wang, Cupertino, CA (US); Aidan N. Zimmerman, Sunnyvale, CA (US); Michael Y. Cheung, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/114,087

(22) Filed: Aug. 27, 2018

Related U.S. Application Data

(60) Provisional application No. 62/558,568, filed on Sep. 14, 2017.

(51) Int. Cl.
| | |
|---|---|
| *G06F 1/16* | (2006.01) |
| *G06F 3/01* | (2006.01) |
| *G06F 3/041* | (2006.01) |
| *G02B 27/01* | (2006.01) |

(52) U.S. Cl.
CPC ....... *G06F 1/1681* (2013.01); *G02B 27/0176* (2013.01); *G06F 1/163* (2013.01); *G06F 3/014* (2013.01); *G06F 3/041* (2013.01); *G06F 2203/0331* (2013.01); *G06F 2203/0339* (2013.01)

(58) Field of Classification Search
CPC ........................................................ G06F 1/16
See application file for complete search history.

(56) References Cited

U.S. PATENT DOCUMENTS

| | | | |
|---|---|---|---|
| 5,631,861 | A | 5/1997 | Kramer |
| 9,110,505 | B2 | 8/2015 | Mastandrea |
| 2003/0132921 | A1 | 7/2003 | Torunoglu |
| 2003/0214481 | A1 | 11/2003 | Xiong |
| 2004/0210166 | A1 | 10/2004 | Soh et al. |
| 2006/0066563 | A1 | 3/2006 | Mochwart |
| 2011/0213664 | A1 | 9/2011 | Osterhout et al. |
| 2012/0218184 | A1 | 8/2012 | Wissmar |
| 2015/0277489 | A1* | 10/2015 | Lin .......................... G06F 1/163 361/679.03 |

(Continued)

FOREIGN PATENT DOCUMENTS

| | | |
|---|---|---|
| JP | 2001104256 A | 4/2001 |
| JP | 2008171409 A | 7/2008 |

(Continued)

*Primary Examiner* — Jerry Wu
(74) *Attorney, Agent, or Firm* — Treyz Law Group, P.C.; G. Victor Treyz; Kendall P. Woodruff

(57) ABSTRACT

An electronic device may have rigid members such as links in a strap that are joined by rotating joints. The joints may include friction hinges. In a head mounted device, straps may be folded for storage within an interior region in the housing of the head mounted device. A strap coupled to a wristwatch may have portions that fold to hide components mounted on the strap. A strap with two parallel strap portions may be configured to serve as a support for a cellular telephone or other device with a display. A strap can also be configured to tilt a display that is coupled to the strap to a desired viewing angle relative to a user's wrist. An electronic device may have multiple support structures that are joined by a friction hinge. The support structures may be used to clamp the device on a user's finger.

5 Claims, 18 Drawing Sheets

(56) References Cited

U.S. PATENT DOCUMENTS

| | | | |
|---|---|---|---|
| 2015/0309535 A1* | 10/2015 | Connor | A61B 5/4875 361/679.03 |
| 2016/0070234 A1* | 3/2016 | Lee | A44C 5/0007 368/282 |
| 2016/0278665 A1 | 9/2016 | Ferreira et al. | |
| 2017/0221465 A1* | 8/2017 | Piccionelli | G10H 1/34 |
| 2018/0008016 A1* | 1/2018 | Tahmasebzadeh | G04G 17/06 |

FOREIGN PATENT DOCUMENTS

| | | |
|---|---|---|
| JP | 2014142751 A | 8/2014 |
| JP | 2015521303 A | 7/2015 |
| JP | 2015219887 A | 12/2015 |
| JP | 2016033815 A | 3/2016 |
| JP | 2016118929 A | 6/2016 |
| WO | 2012176610 A1 | 12/2012 |

* cited by examiner

HINGED WEARABLE ELECTRONIC DEVICES

This application claims the benefit of provisional patent application No. 62/558,568, filed Sep. 14, 2017, which is hereby incorporated by reference herein in its entirety.

FIELD

This relates generally to electronic equipment, and, more particularly, to wearable electronic devices with input-output capabilities.

BACKGROUND

Electronic devices may have components such as straps. Straps can be used to hold a device in place on the body of a user. For example, a strap can be used to hold a wristwatch on the wrist of a user or a strap may be used to hold a head-mounted display on the head of a user.

In some situations, straps may be insufficiently durable, may not be visually appealing, or may be insufficiently adjustable to provide a user with desired functionality.

SUMMARY

An electronic device may have rigid members such as links in a strap that are joined by rotating joints. The joints may include spring-loaded joints such as joints that include torsion springs, may include friction hinges, and may include freely rotating hinges.

Straps may be used to form watch bracelets, straps for head mounted devices, and straps for other electronic equipment. In some configurations, circuitry can be included in the rigid members that form a strap. This circuitry may include, for example, sensors, control circuitry for gathering user input from the sensors, wireless circuitry for receiving information from remote equipment, and haptic output devices that the control circuitry can use to provide a user with haptic output based on user input from a sensor, information received from wireless communications circuitry, and/or other information.

In a head mounted device, straps may be folded for storage within an interior region in the body of the head mounted device. The strap coupled to a wristwatch may have portions that fold to hide displays or other components mounted on the strap. A strap with two parallel strap portions or other strap may be configured to serve as a support for a cellular telephone or other device with a display. A strap can also be configured to tilt a display that is coupled to the strap to a desired viewing angle relative to a user's wrist.

An electronic device may have a pair of support structures with ribs or other members that are joined by a friction hinge. Sensors, haptic output devices, and other components may be mounted to the support structures. Elastomeric material may be molded over the ribs. Freely rotating joints may be used to support the ribs while allowing the support structures to twist along their lengths.

DETAILED DESCRIPTION

Electronic devices may be provided with straps or other structures that allow the devices to be worn on the body of a user. In some embodiments, a device may be provided with one or more straps. Straps and other structures in an electronic devices may have members that are joined by rotatable joints. The joints may include friction hinges, spring-loaded hinges, and freely-rotating hinge joints.

Hinged straps and other structures in a device may be used to allow a device to be worn on a user's body. For example, a hinged device may be worn on a user's finger, wrist, arm, hand, head, neck, leg, foot, waist, or other body part. Configurations in which wearable devices such as devices with hinged straps and other hinged structures are worn on a user's finger, wrist, and head, may sometimes be described herein as example. This is merely illustrative. The devices may be worn on any suitable portion of a user's body.

Figure 1:
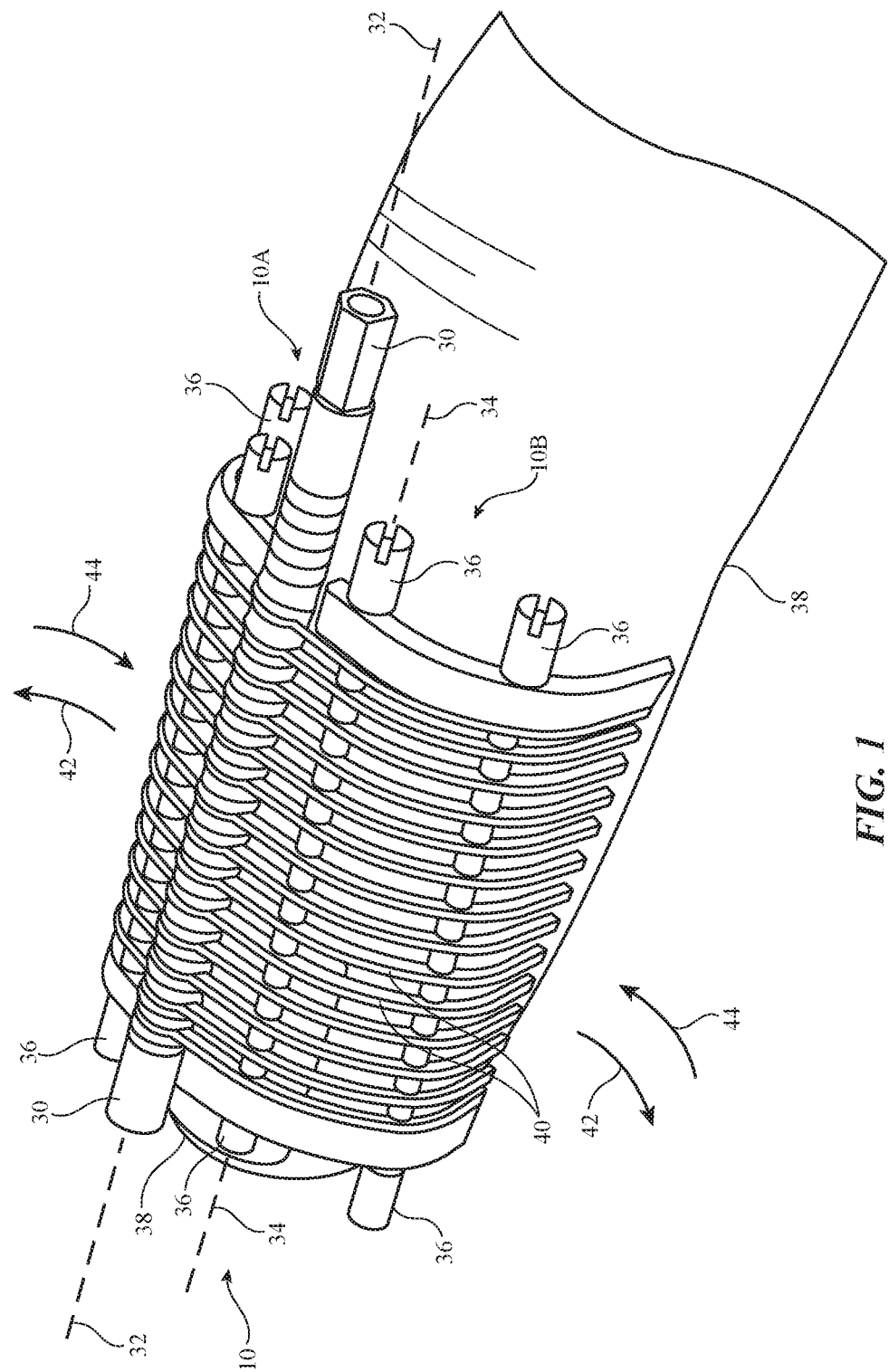
FIG. 1 is a perspective view of an illustrative hinged wearable device in accordance with an embodiment.

A perspective view of an illustrative hinged wearable electronic device is shown in FIG. 1. As shown in FIG. 1, device 10 may have first and second support structures such as first portion 10A and second portion 10B. Portions 10A and 10B may rotate relative to each other about hinge axis 32. Compressing member 30 (e.g., a bolt) may squeeze portions of ribs 40 together to form a friction hinge at a joint associated with axis 32. When portions 10A and 10B are spread open in directions 42 (e.g., when rotated away from each other about axis 32), device 10 will be released from user finger 38. When portions 10A and 10B are rotated towards each other in directions 44 about axis 32, portions 10A and 10B clamp down on user finger 38 and hold device 10 in place on finger 38.

Ribs 40 of portions 10A and 10B may be supported by support members 36. Members 36 may be, for example, bolts that extend through openings in ribs 40 and that run along respective bolt axes such as axis 34. Support members 36 may be loosely coupled to ribs 40 through the openings in ribs 40. As a result, ribs 40 may be allowed to rotate around support members 36, thereby allowing the portions 10A and 10B to twist along their lengths. As an example, portions 10A and 10B may twist inwardly towards each other at the tip of finger 38 (e.g., so that the outline of device 10 tapers inwardly at increasing distances towards the tip of finger 38). Other twisting arrangements may also be used to accommodate mounting of a hinged device such as device 10 on a user's body. The example of FIG. 1 is merely illustrative.

In general, the joints that join structures in device 10 may be provided with friction hinges (e.g., hinges in which friction is created by compressing members towards each other or using other friction hinge arrangements such as the joint formed along axis 32 of FIG. 1 between portions 10A and 10B of device 10 of FIG. 1), may be provided with spring-loaded hinges (e.g., torsion springs or other biasing structures), and/or may be freely rotating hinges that do not include friction structures or biasing structures Device 10 may include circuitry that is mounted to the support structures of FIG. 1 (e.g., portions 10A and/or 10B), a cosmetic cover, and/or other components. During operation, sensors and other input circuitry in device 10 can gather input such as user input. Output components can provide a user with corresponding output (e.g., haptic output or other output based on a sensor input, output based on information received by device 10 using wired or wireless communications circuitry, etc.). Device 10 can be used as a stand-alone device or as an accessory for use with other devices (e.g., in a configuration in which the output supplied by device 10 includes control signals that adjust an on-screen cursor in other equipment based on input gathered with device 10, etc.).

Figure 2:
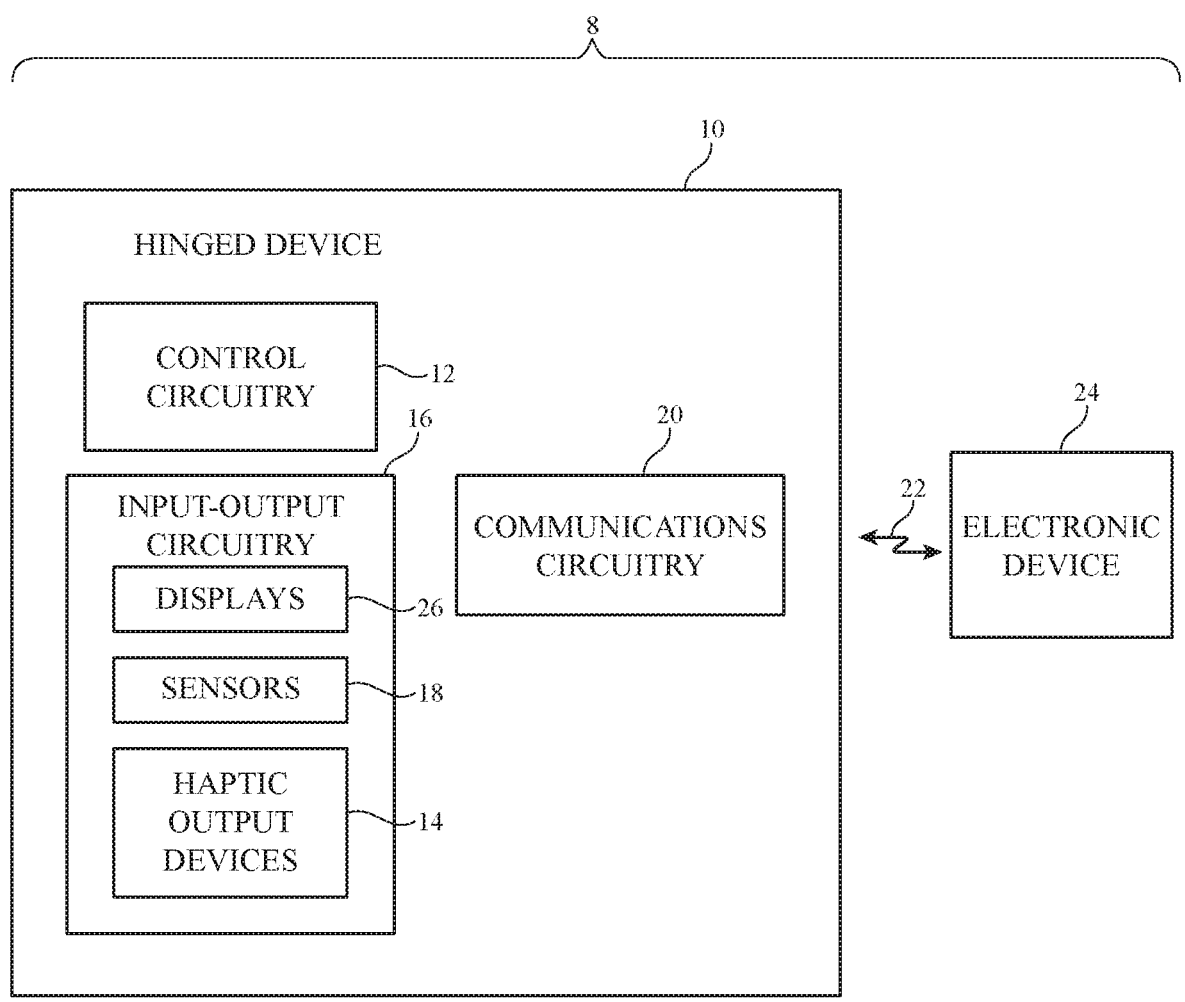
FIG. 2 is a schematic diagram of an illustrative system in accordance with an embodiment.

A schematic diagram of a system that may include a wearable electronic device such as the hinged finger-mounted device of FIG. 1 or other wearable device is shown in FIG. 2. Electronic systems such as illustrative system 8 of FIG. 2 may include electronic devices such as electronic device 10 and one or more additional electronic devices such as electronic device 24. Device 10 and/or device 24 may be a wearable device (e.g., a finger-mounted device as shown in FIG. 1, a wristwatch device or other device worn on a wrist, a device worn on an arm, head, neck, waist, foot, leg, or other portion of a user's body, etc.), may be a stand-alone mouse, trackpad, or other pointing device, a laptop computer, a computer monitor containing an embedded computer, a tablet computer, a cellular telephone, a media player, or other handheld or portable electronic device, a pendant device, a headphone or earpiece device, a device embedded in eyeglasses or other head-mounted equipment worn on a user's head, or other wearable or miniature device, a computer display that does not contain an embedded computer, a gaming device, a navigation device, an embedded system such as a system in which electronic equipment with a display is mounted in a kiosk or automobile, a remote control, a voice-controlled internet-connected speaker (e.g., an artificial intelligence assistance device, home assistant, etc.), a set-top box, equipment that implements the functionality of two or more of these devices, or other electronic equipment. Illustrative configurations in which device 10 is a wearable device and in which device 24 is a computer or other electronic equipment that is controlled using input from a user that is gathered by one or more sensors in the computer pointing device and/or in which device 10 is a stand-alone device may sometimes be described herein as an example. Other devices may be used in system 8, if desired.

As illustrated by communications link 22, device 10 may communicate with one or more additional devices such as device 24. Devices such as device 24 may be peer devices (e.g., additional devices such as device 10), may be accessories (e.g., speakers, headphones, displays, pointing devices, and/or other accessories that operate with device 10), and/or may be one or more electronic devices that are controlled by device 10 (e.g., a cellular telephone, a computer, a television, a display with an embedded computer, a display without any embedded computer, a set-top box, a countertop digital assistant, and/or other electronic equipment). Links such as link 22 in system 8 may be wired or wireless communication links. Each device in system 8 such as device 10 may include communications circuitry such as communications circuitry 20 of device 10 for supporting communications over links such as link 22.

Communications circuitry 20 may include wired and wireless communications circuitry. Communications circuitry 20 in one device may be used to support communications over one or more wired or wireless communications links (e.g., link 22) with one or more additional devices (e.g., a peer device, a host, an accessory, etc.). Wireless circuitry in communications circuitry 20 may include one or more antennas and one or more radio-frequency transceiver circuits. Wireless communications circuitry may be used to support wireless communications over cellular telephone bands, wireless local area network bands, near field communications bands, etc.

Each of the electronic devices in system 8 such as illustrative electronic device 10 may include control circuitry such as control circuitry 12 of device 10. Control circuitry 12 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 12 may be used to control the operation of device 10. The processing circuitry may be based on one or more microprocessors, microcontrollers, digital signal processors, baseband processors, power management units, audio chips, application specific integrated circuits, etc.

Input-output circuitry may be included in each device in system 8. As shown in FIG. 2, for example, device 10 may include input-output circuitry 16 to allow data to be supplied to device 10 and to allow data to be provided from device 10 to external devices such as device 24. Input-output circuitry 16 may include input-output devices such as buttons, joysticks, scrolling wheels, touch pads, key pads, keyboards, microphones, speakers, tone generators, vibrators, cameras, displays and/or other light-emitting components, light-emitting diodes and other status indicators, data ports, etc.

As shown in FIG. 2, for example, input-output devices 16 may include sensors such as sensors 18. Sensors 18 may include microphones, force sensors, touch sensors, temperature sensors, air pressure sensors, moisture sensors, ambient light sensors and other light-based sensors, magnetic sensors, sensors for measuring movement of device 10 along a surface, image sensors for such as visible-light and infrared cameras (e.g., digital image sensors and lenses for measuring three-dimensional hand gestures and other user gestures, etc.), grip sensors (e.g., capacitance-based grip sensors, optical grip sensors, etc.), and/or other sensors. If desired, sensors 18 may include sensors for measuring the orientation, movement, and/or position of device 10 such as inertial measurement units that include accelerometers, compasses, and/or gyroscopes. An accelerometer may be used to measure vibrations that pass to device 10 through a tabletop or other surface from a user's fingers.

In some configurations, circuitry 16 may include one or more displays 26. Displays 26 may be light-emitting diode displays such as an organic light-emitting diode displays, liquid crystal displays, electrophoretic displays, or other suitable displays. Displays 26 may be touch sensitive displays (e.g., touch screen displays that include two-dimensional touch sensors), may include force sensors, and/or may include other sensors.

Haptic output components 14 may be used for providing a user with haptic output. Haptic output components 14 may include piezoelectric devices, electromagnetic actuators (e.g., servomotors, linear actuators, vibrators, etc.), actuators based on electroactive polymers, actuators based on shape memory alloy structures, and/or other haptic output components. Haptic output components 14 in input-output devices 16 may be used to provide haptic output to a user based on sensed user input, wirelessly received information, and/or other information. In some configurations (e.g., when a haptic output component 14 has a piezoelectric material), components can serve both as haptic output components 14 and as sensors 18. For example, a piezoelectric material may be driven with a signal to supply haptic output and, when not driven, may produce an output signal indicative of applied force.

In addition to displays 26, sensors 18, and haptic output devices 14, device 10 may include other input and output components. For example, device 10 may include output components such as speakers and other components that create sound, status indicator lights and other light-emitting components, and/or other components that generate output.

During operation, electronic device 10 may gather information about the environment surrounding device 10 and user input. As an example, sensors in device 10 may make pressure measurements, temperature measurements, ambient light measurements, and other measurements on the ambient environment. Device 10 may also measure user touch input, user force input, user motion input, user voice input, and other user input. In some configurations, health data may be gathered (e.g., user heartbeat information, etc.). Based on environmental data, user input, and/or based on wirelessly received information and/or information received over a wired link, device 10 can take suitable actions. For example, device 10 may display information on displays, may play sound through speakers, may issue alerts, may play media for a user, may support two-way communications with other devices, may produce haptic output with haptic output devices 14, and/or may perform other electronic device functions. User input may be used in manipulating visual objects (e.g., icons, etc.), may be used in supplying system 8 with text, may be used in making menu selections, and/or may otherwise be used in operating the equipment of system 8.

Joints in device 10 may be used to allow support structures such as ribs 40 in respective support structures such as portions 10A and 10B of FIG. 1 or other support members (e.g., bracelet links in a wrist strap, links in a head strap, other rigid members, and/or other structures in device 10) to rotate relative to each other. An illustrative joint that may be used to facilitate rotational movement between members in device 10 is shown in FIG. 3.

Figure 3:
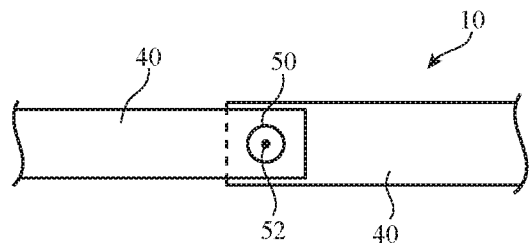
FIG. 3 is a side view of illustrative support members coupled at a joint in an illustrative hinged wearable device in accordance with an embodiment.

As shown in FIG. 3, device 10 may include movable members such as members 40. Members 40 may be coupled at joint 50. Joint 50 may have mating structures that form a hinge (e.g., a hinge that allows members 40 to rotate relative to each other about rotational axis 52). In some configurations, joint 50 may be provided with structures that produce sufficient friction to hold members 40 in place after they have been moved into a particular position by a user. In these configurations, joint 50 may form a friction hinge. As another example, joint 50 may be provided with structures that allow members 40 to rotate freely with respect to each other without imparting significant force. In these situations, joint 50 does not form a friction hinge and members 40 will not remain in a defined position after being positioned. In another arrangement, a flexible biasing structure such as a torsion spring or other spring may be used to push members 40 in defined directions relative to each other. For example a torsion spring may cause one member to rotate clockwise about rotational axis 52 relative to another.

Figure 4:
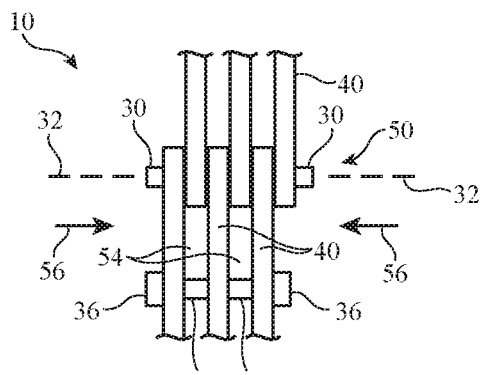
FIG. 4 is a top view of illustrative support members in a hinged wearable device in accordance with an embodiment.

FIG. 4 is a top view of a portion of device 10 of FIG. 1. As shown in the example of FIG. 4, compressing member 30 may be tightened to press rib members 40 together in directions 56. This causes friction between adjacent members 40 so that joint 50 forms a friction hinge at axis 32.

Support member 36 may have portions 36' that help separate respective members 40 to create gaps 54. Member 36 may be a rod or other member that passes through openings (e.g., circular openings) in members 40 to allow member 36 to form a freely moving (non-friction-hinge) joint (e.g., to allow members 40 to twist along the lengths of support structures 10A and 10B when device 10 is mounted on a user's finger).

Figure 5:
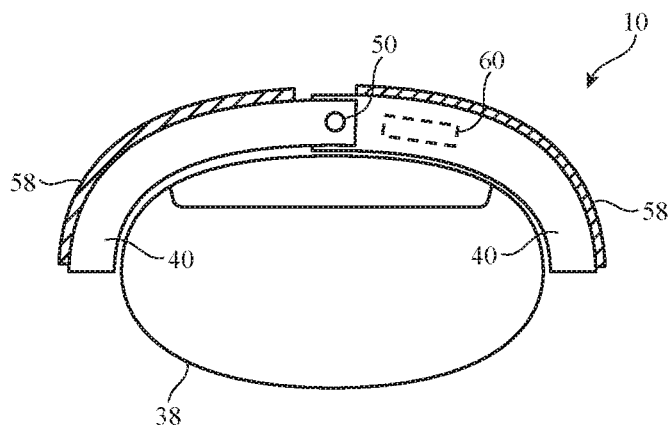
FIG. 5 is an end view of an illustrative hinged wearable device having first and second support structures joined by a friction hinge and configured to clamp to a user's finger in accordance with an embodiment.

FIG. 5 is a front view of a portion of device 10 of FIG. 1. As shown in FIG. 5, device 10 may, if desired be provided with housing structures such as housing structure 58. Structure 58 may, for example, have portions that form a cosmetic cover for device 10. Internal components such as component 60 may include input-output circuitry 16, control circuitry 12, and/or communications circuitry 20 of FIG. 2. Housing structure such as housing structure 58 of FIG. 5 and/or support structures such as structures 40 of FIG. 5 and/or other structural portions of device 10 (e.g., rigid link members in a strap, etc.) may be formed from metal, plastic, glass, or other materials, and may include sheets of material, fabric, molded parts, wires, etc.

Figure 6:
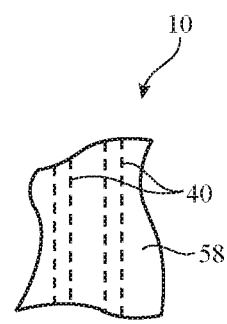
FIG. 6 is a diagram showing how a hinged wearable device may have support members such as ribs embedded in a polymer in accordance with an embodiment.
Figure 7:
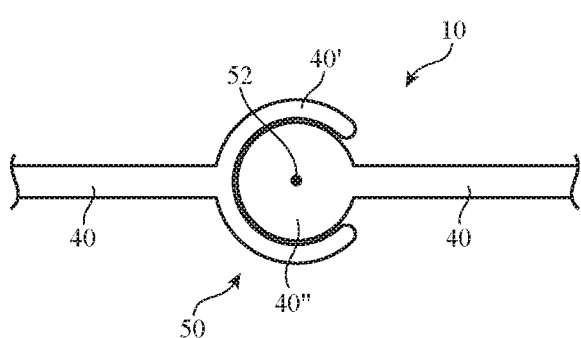
FIG. 7 is a side view of an illustrative friction hinge in accordance with an embodiment.

If desired, rigid structures (e.g., ribs 40 or other support structures) may be embedded in polymer (e.g., molded polymer). For example, housing structure 58 may be formed from rigid and/or flexible polymer that is molded over some or all of members 40 (e.g., members 40 can be embedded in an elastomeric polymer or a rigid polymer forming housing structures such as structure 58, as shown in FIG. 6). The side view of FIG. 7 shows how joint 50 may be a friction hinge formed from mating portions 40' and 40" of structures in device 10 such as members 40.

Figure 8:
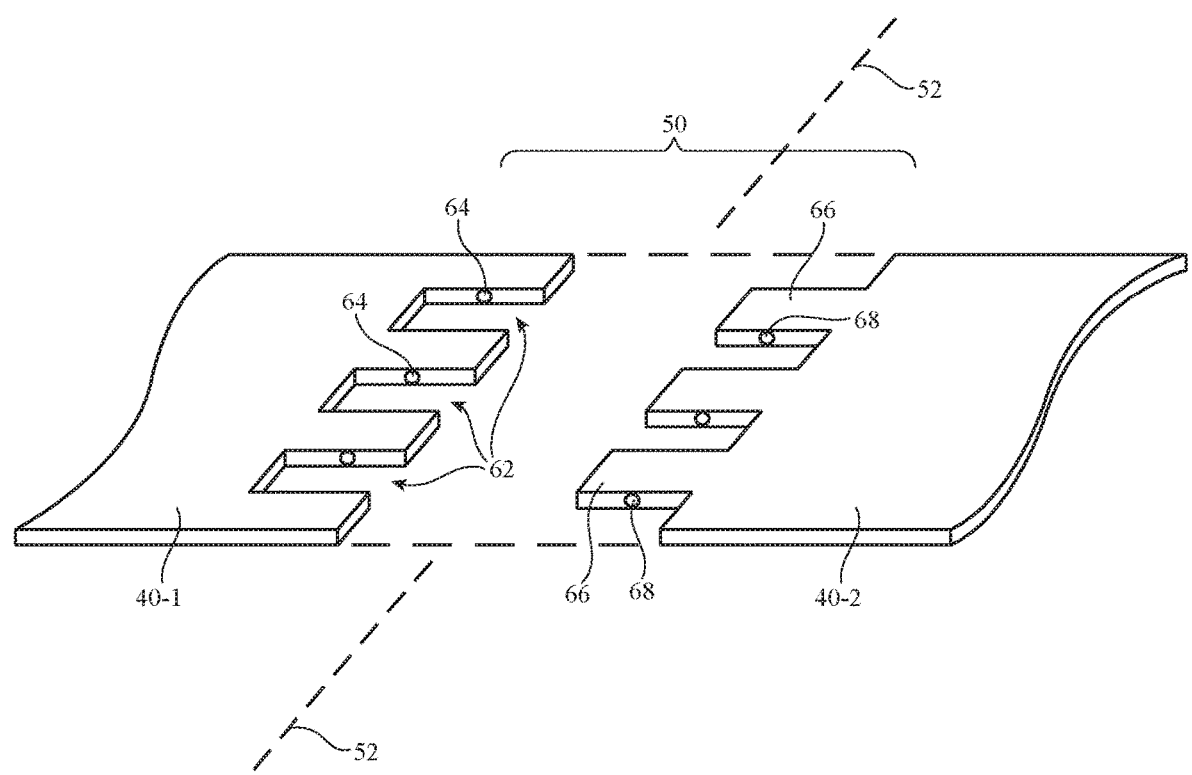
FIG. 8 is an exploded perspective view of a pair of illustrative members with interlocking structures configured to form a joint such as a friction hinge joint in accordance with an embodiment.
Figure 9:
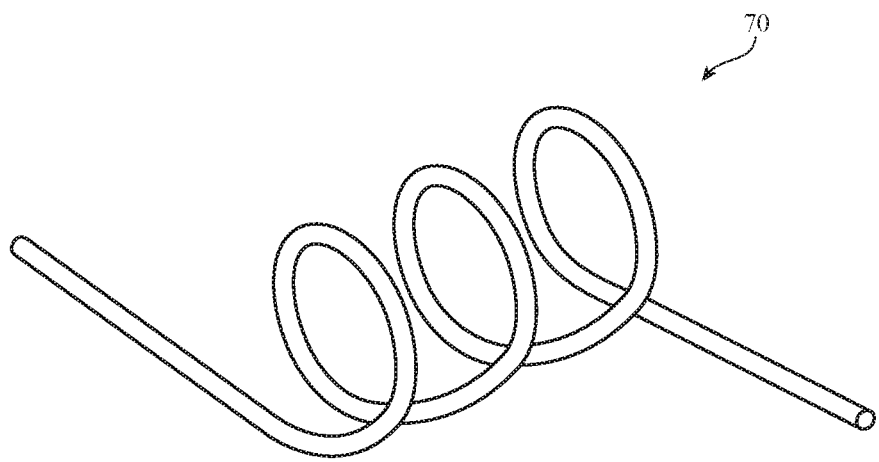
FIG. 9 is a perspective view of an illustrative torsion spring for use in a spring-loaded hinge joint in a hinged wearable device in accordance with an embodiment.

FIG. 8 is a perspective view of a portion of device 10 in which mating support structures such as members 40-1 and 40-2 have been configured to form joint 50. Member 40-1 has slots or other recessed portions 62 that receive corresponding tabs or other protruding portions 66 of member 40-2. Recesses 64 and mating protrusions 68 may help hold members 40-1 and 40-2 together. If desired, pins and/or other structures may be used to further support members 40-1 and 40-2. The friction produced when mating members 40-1 and 40-2 so that protrusions 68 are received within corresponding recesses 64 may be sufficient to allow joint 50 to serve as a friction hinge (e.g., to hold members 40-1 and 40-2 in a desired configuration) and/or so that joint 50 allows members 40-1 and 40-2 to rotate freely about axis 52. In arrangements in which a spring-loaded joint is desired, a torsion spring such as spring 70 of FIG. 9 or other spring may be incorporated into joint 50 (e.g., to form a torsion spring hinge or other spring-loaded hinge).

Figure 10:
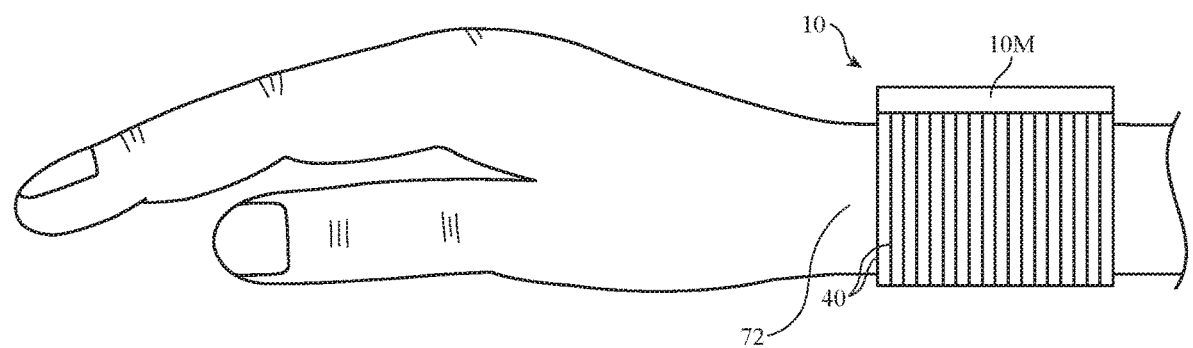
FIG. 10 is a side view of an illustrative hinged wearable device with rigid rib members that is being worn on a user's wrist in accordance with an embodiment.

FIG. 10 is a side view of a user's hand and an associated hinged wearable device. As shown in FIG. 10, device 10 may have housing structures such as one or more rigid housing wall members that form main unit 10M. Components such as control circuitry 12, input-output circuitry 16, and/or communications circuitry 20 may be used in main unit 10M and/or other portions of device 10. Device 10 may also have a wrist band (strap, etc.) formed from hinged members 40 (e.g., members 40 such as ribs that are joined along rotational axis 32 of FIG. 1 using compressing member 30 to form a friction hinge and/or other joint that allow members 40 to rotate relative to each other and clamp onto or otherwise conform to the shape of user wrist 72).

Figure 11:
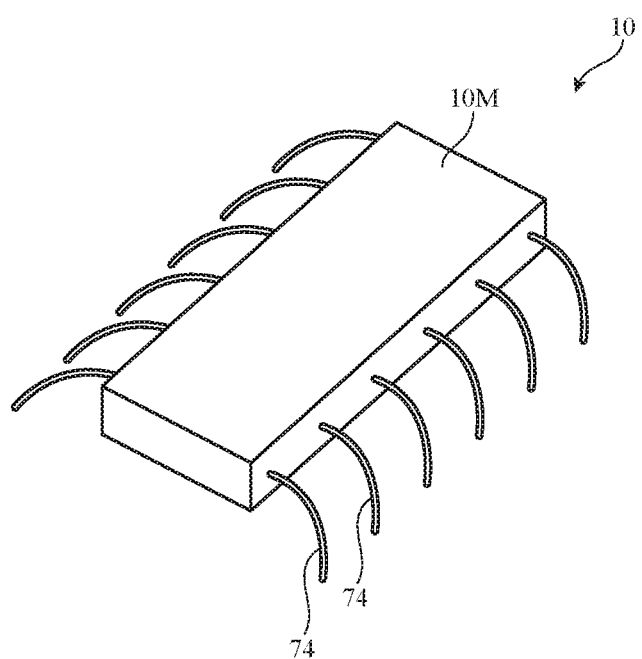
FIG. 11 is a perspective view of an illustrative wearable device with deformable members such as wires in accordance with an embodiment.

If desired, device 10 may have deformable members such as members 74 of FIG. 11. Members 74 may be formed from deformable metal encapsulated in a soft elastomer (e.g., silicone) and/or other plastic and may be coupled to main unit 10M. Each member 74 may be individually deformed into a desired shape so that device 10 can be worn on the body of a user. Devices such as illustrative device 10 of FIG. 10 and device 10 of FIG. 11 may, if desired, be worn on a user's arm, leg, foot, hand, wrist, finger, and/or other portion of a user's body. A fabric covering, plastic covering, metal covering, leather covering, and/or other covering layer(s) may be used to enclose device 10 and the circuitry of FIG. 2 that is incorporated into the structures of device 10.

Figure 12:
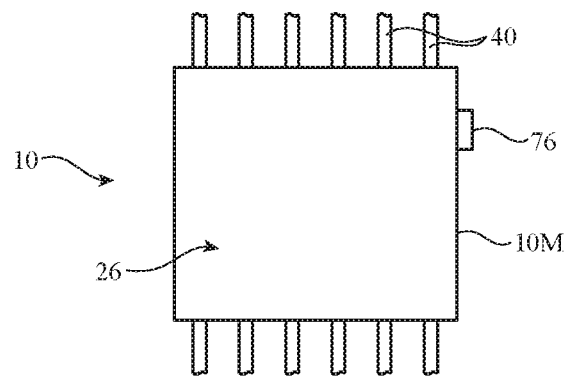
FIG. 12 is a top view of an illustrative wearable device with hinged members that are coupled to a rigid housing member associated with the main unit of the device in accordance with an embodiment.

FIG. 12 is a top view of a portion of device 10 showing how rib members 40 may be coupled to main unit 10M. Joints with compressing members 30 may be located at one or more locations along the lengths of members 40 (e.g., in configurations in which portions of rib members 40 rotate relative to each other). Device 10 of FIG. 12 may be, for example a wrist watch device in which main unit 10M has rotatable knob 76 (sometimes referred to as a digital crown) for supplying user input to device 10. In some configurations, members 40 may have joints that couple members 40 of FIG. 12 to additional members such as planar rigid bracelet links to form a wrist strap. If desired, a touch sensitive display 26 may be mounted on the front (top) face of main unit 10M or elsewhere in device 10.

Figure 13:
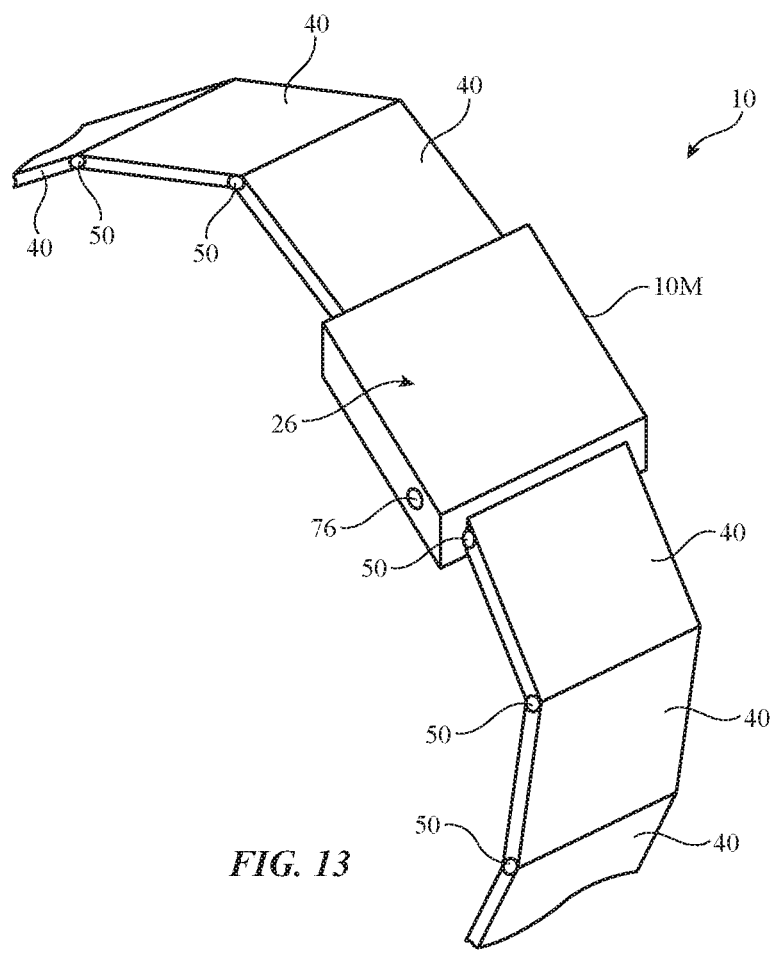
FIG. 13 is a perspective view of an illustrative wearable device with a strap formed from hinged members in accordance with an embodiment.

FIG. 13 is a perspective view of device 10 in an illustrative configuration in which the housing structures that form main unit 10M have been coupled to a wrist strap (e.g., a bracelet) formed from planar members 40. Planar members 40, which may sometimes be referred to as links, strap segments, or bracelet segments, may be joined with joints 50 (friction hinges, torsion spring hinges, freely rotating hinges, etc.). Members 40 (e.g., members 40 at or near the ends of the strap) may include magnets and/or other structures for forming a clasp that joins these members together and holds the strap onto the user's wrist or other body part.

Figure 14:
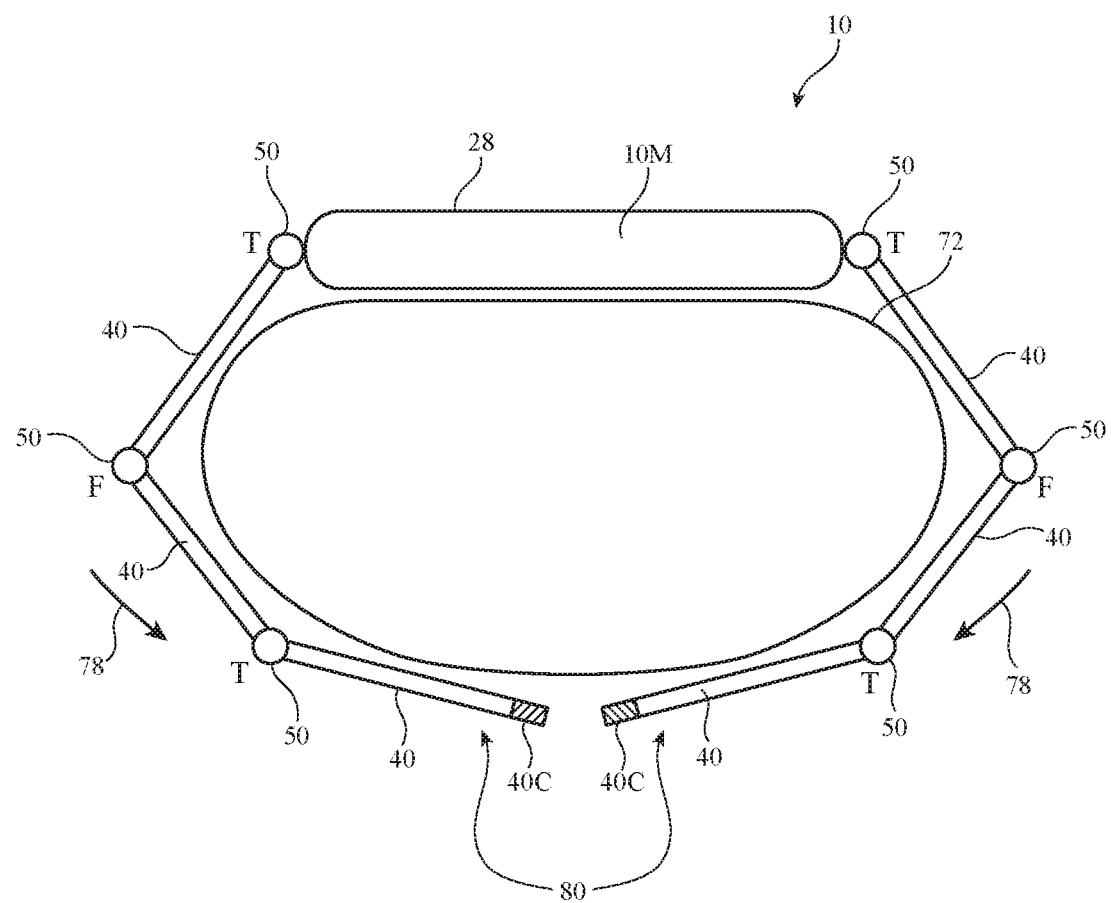
FIG. 14 is a side view of an illustrative wearable device in which members are coupled at joints such as joints with friction hinges and/or torsion springs in accordance with an embodiment.

As shown in the side view of FIG. 14, some of joints 50 may be torsion spring hinges (T) and some of joints 50 may be friction hinges (F). This allows the shape of the strap formed from link members 40 to be adjusted comfortably around wrist 72 of a user. The torsion springs at torsion spring hinges T may, as an example, be configured to cause the strap of device 10 to clamp inwardly in directions 78 on the user's wrist 72. Portions 40C may form a clasp for the strap (e.g., a magnetic clasp or other fastener). If desired, members 40 may be omitted from strap closure region 80 (e.g., toから an open U-shaped bracelet that holds itself on wrist 72 without a closure and without closing completely).

Figure 15:
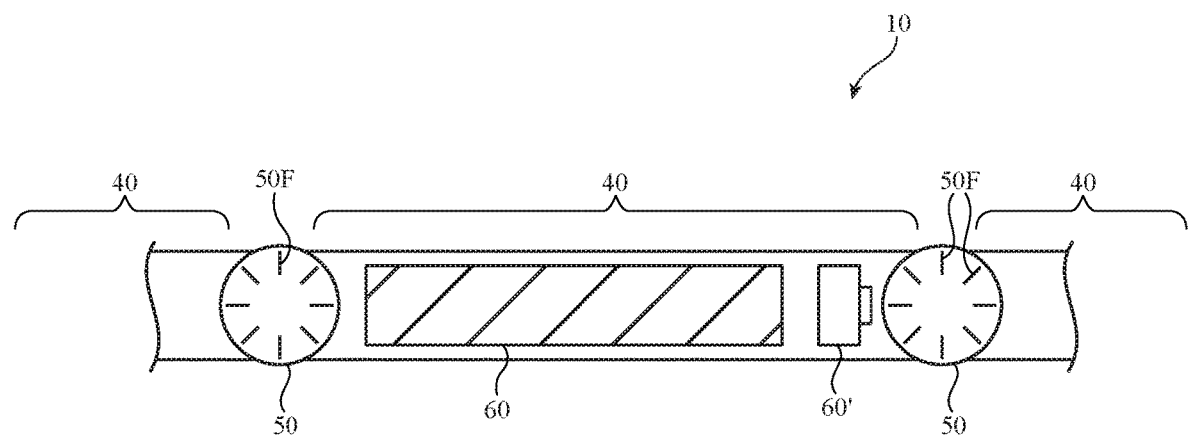
FIG. 15 is a side view of a portion of a wearable device having a rotational encoder and other circuitry in accordance with an embodiment.

As shown in FIG. 15, members 40 (e.g., links in a bracelet-style strap with joints 50 as shown in FIG. 14 and/or other members in a hinged device arrangement) may serve as housings for circuitry 60. Circuitry 60 may, for example, include components that are mounted to exterior portions of members 40 and/or within interior regions of members 40. The circuitry mounted in members 40 may include sensors 18 and other components for gathering user input (e.g., user touch input, tap input, force input, proximity gesture input, etc.), may include haptic output devices 14 for providing corresponding haptic output (e.g., haptic feedback, haptic alerts, etc.), may include control circuitry 12 and communications circuitry 20, may include display(s) 26, and/or may include other circuitry. Components such as these may also be mounted in main unit 10M and/or other housing structures for device 10. Wires, traces on flexible printed circuits and rigid printed circuits, and/or other signal paths and/or wireless links may be used in conveying signals between circuitry in members 40 and/or between circuitry in members 40 and main unit 10M.

FIG. 15 shows how members 50 may be jointed using joints 50 that include fiducials, magnets, and/or other encoding information 50F. Encoding circuitry 60' (e.g., a sensor 18 such as an optical encoder, capacitive encoder, resistive encoder, and/or other rotary encoder) may sense the rotational orientation of a corresponding joint 50 (e.g., by measuring the orientation of fiducials 50F and/or by making other measurements indicative of the relative angular orientations of adjacent members 40). Using this information, control circuitry 12 can determine the orientation of some or all members 40 relative to other members 40 (e.g., adjacent members 40) and can take suitable action. For example, control circuitry 12 can adjust the type of output that is being supplied to a user (e.g., content can be adjusted) and/or the mode of providing output (e.g., visual, haptic, audio, etc.) based on determining whether device 10 is being worn or has been removed from a user's body, etc. Control circuitry 12 may also place device 10 in a low-power sleep mode (e.g., when device 10 is not being worn) or may awaken device 10 from a low-power sleep mode (e.g., in response to determining that device 10 is being worn) based on information from rotational encoder 60').

Figure 16:
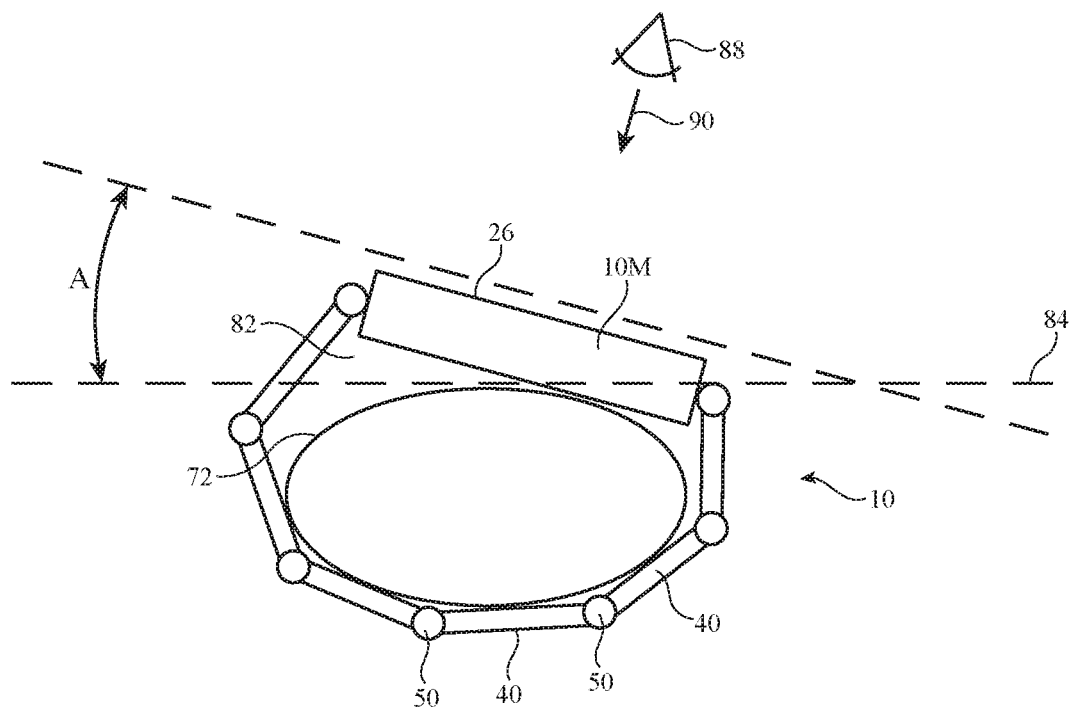
FIG. 16 is a side view of an illustrative hinged wearable device that has been positioned to enhance user viewing of a display in accordance with an embodiment.

As shown in the cross-sectional side view of illustrative device 10 of FIG. 16, the presence of joints 50 (e.g., joints with friction hinges and/or torsion springs, etc.) allows main unit 10M of device 10 to be selectively placed at an angled position with respect to user's wrist 72. A user may, for example, manipulate members 40 of the strap of device 10 to tilt display 26 and main unit 10M at a non-zero angle A with respect to horizontal axis 84 (e.g., when wrist 72 is being held horizontal). This creates an air gap 82 between main unit 10M and part of the upper surface of wrist 72 and angles display 26 toward the user. As shown in FIG. 16, the angle A may be selected to enhance viewing for a user such as viewer 88 who is viewing device 10 in direction 90.

Figure 17:
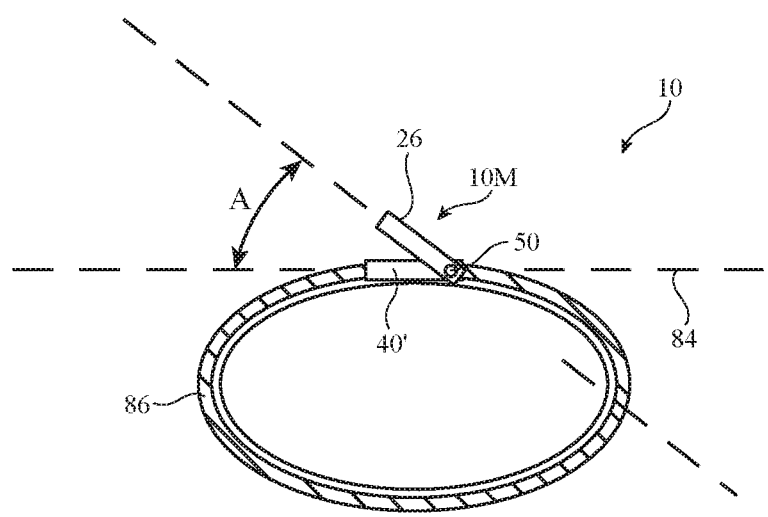
FIG. 17 is a side view of an illustrative wearable device with a tilting display in accordance with an embodiment.

FIG. 17 is a cross-sectional side view of device 10 in an illustrative configuration in which main unit 10M is coupled to a strap formed from support member 40' using a joint 50 (e.g., a friction hinge) that is located along one edge of main unit 10M. This allows unit 10M and display 26 to be rotated by angle A, as described in connection with FIG. 16. As shown in FIG. 17, the strap for device 10 may, if desired, include a flexible band such as band (strap) 86 (e.g., a band formed from leather, plastic, fabric, chain links, metal link segments such as members 40 that are coupled by joints 50, etc.).

Figure 18:
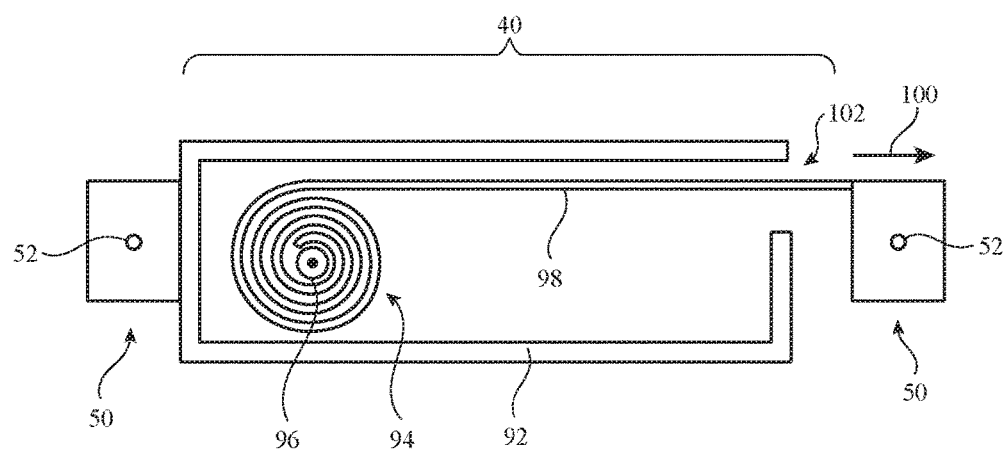
FIG. 18 is a side view of an illustrative expandable link member for a strap or other structure in a hinged wearable device in accordance with an embodiment.
Figure 19:
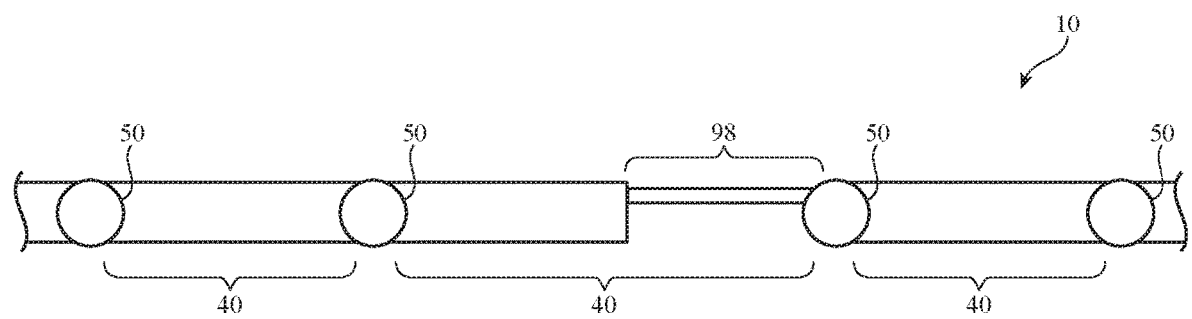
FIG. 19 is a cross-sectional side view of the illustrative link member of FIG. 18 in an expanded configuration within a strap in a wearable device in accordance with an embodiment.

FIG. 18 shows how bracket links such as member 40 may have extendable structures that allow the length of the strap for device 10 to be adjusted. In the example of FIG. 18, extendable member 98 is a layer of flexible material that is stowed in the interior of member 40 (e.g., inside wall 92). When it is desired to stow member 98, member 98 may be wrapped around roller 96, as shown by retracted portion 94 of member 98. When it is desired to extend the length of member 40, member 98 may be extended outwardly in direction 10 through opening 102 in wall 92 of member 40. Roller 96 may be spring loaded, may have a clutch or other structure that applies a fixed and/or variable friction to roller 96, may have a locking mechanism (e.g., to lock member 98 in a retracted, partially extended, or fully extended position), and/or may have a motor or other electrically adjustable component to electrically adjust the length of member 98. FIG. 19 is a side view of a portion of device 10 showing member 98 in an extended position. This lengthens the length of the member 40 containing member 98 and thereby lengthens the strap or other hinged structure formed from members 40 of device 10.

Figure 20:
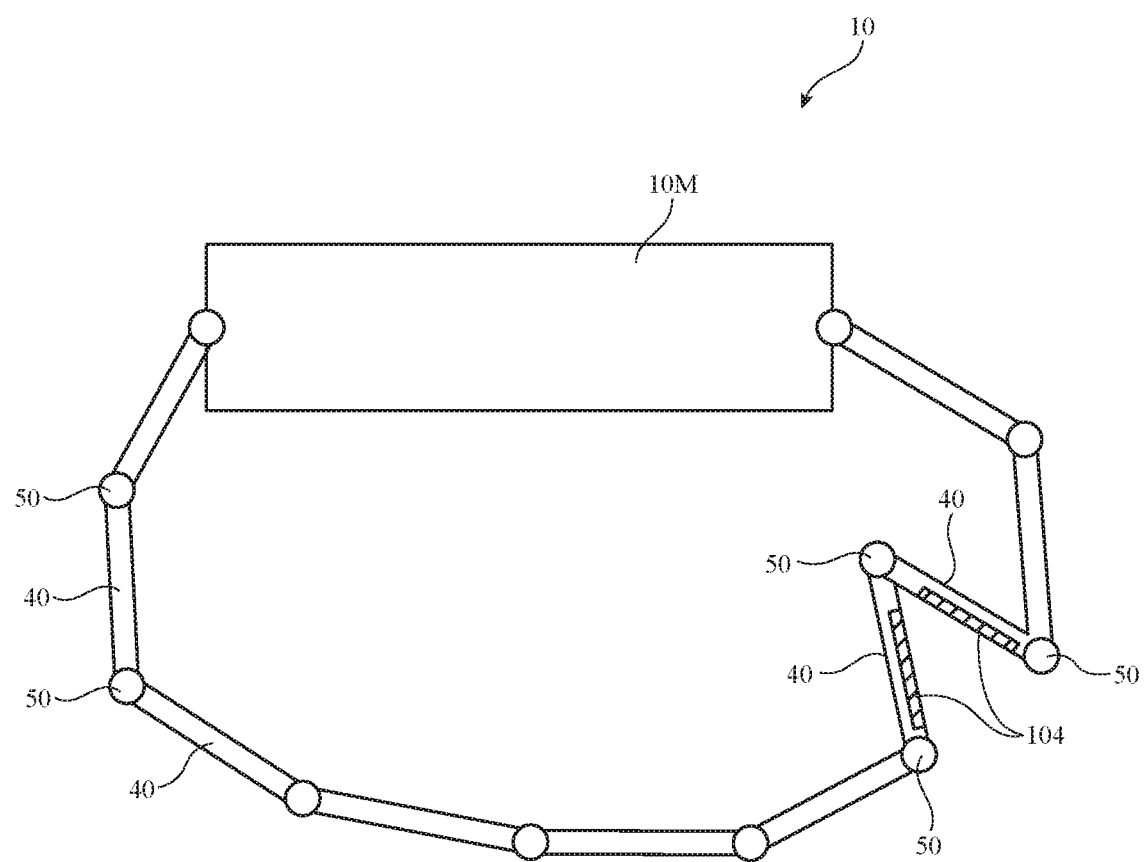
FIG. 20 is a cross-sectional side view of an illustrative hinged wearable device showing how components such as displays can be mounted within folded link members in accordance with an embodiment.

Another illustrative configuration for device 10 is shown in 20. As shown in FIG. 20, components 104 may be mounted on one or more of members 40. Components 104 may be displays 26, sensors 18, haptic output devices 14, other input-output circuitry 16, etc. For example, components 104 may be touch sensitive displays (displays with pixel arrays overlapped by touch sensors) that overlap haptic output devices. The strap for device 10 may have sufficient length to allow the members 40 that include components 104 to be folded back on themselves (e.g., folded towards each other to hide components 104 from view when the strap is being worn around a user's wrist). When it is desired to view content on component 104 (e.g., displays), members 40 can be unfolded by rotating these members about joint 50.

Figure 21:
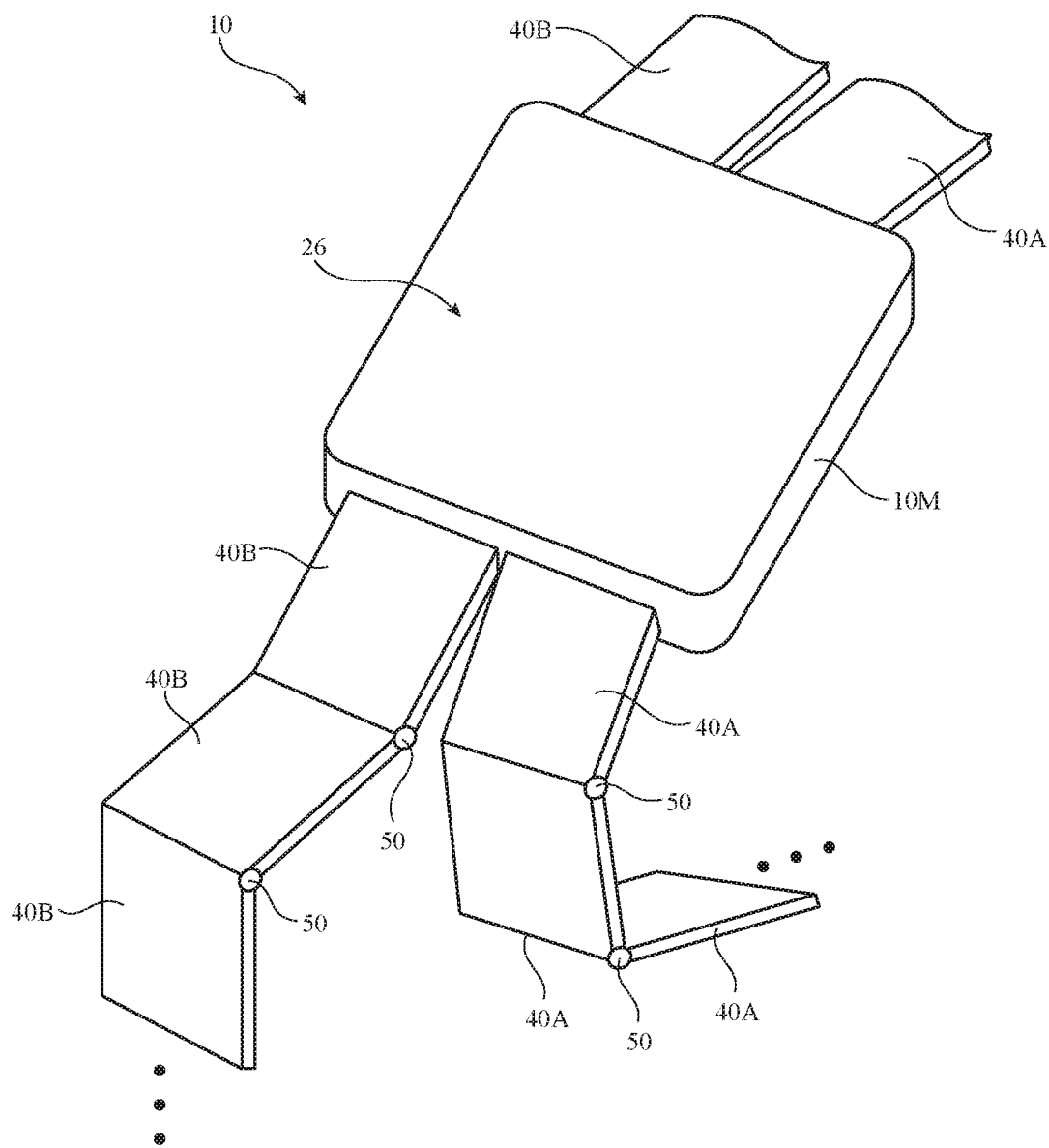
FIG. 21 is a perspective view of an illustrative device with a pair of parallel independently adjustable hinged strap portions in accordance with an embodiment.
Figure 22:
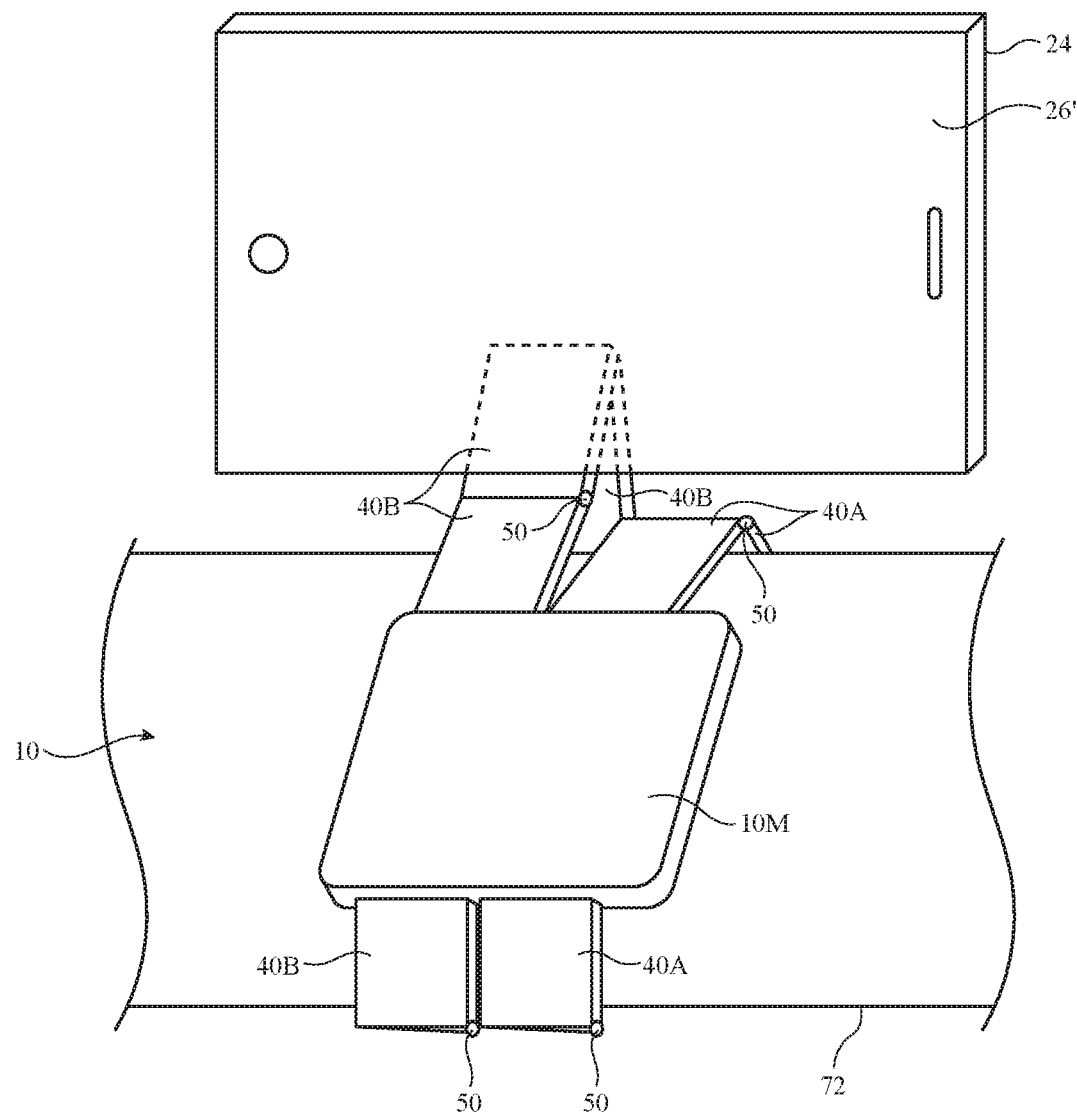
FIG. 22 is a perspective view of the illustrative device of FIG. 21 in an arrangement in which one of the hinged strap portions has been configured to form a stand for a portable electronic device with a display such as a cellular telephone in accordance with an embodiment.

As shown in FIG. 21, the strap of device 10 may have multiple parallel strap portions formed from respective sets of members 40 (e.g., a first strap portion formed from members 40A and a second strap portion formed from members 40B) that are joined by joints 50 (friction hinges, torsion spring hinges, freely rotating hinges, etc.). The members of each of the parallel strap portions can be adjusted independently (e.g., to form a display stand or other support structures, to allow a component on a member of one portion to be angled at an angle that is desirable for viewing or other use while the other portion remains wrapped around a wrist or other portion of a user's body). Magnetic attachment structures, clamps or other mechanical attachment structures, or other mounting structures may be used mount an external device with a display on one or both of the parallel strap portions in device 10. For example, a cellular telephone or other electronic device such as electronic device 24 of FIG. 22 may be mounted to a first strap portion formed from members 40B while a second parallel strap portion formed from members 40A is used to hold device 10 on a user's wrist. This allows a user to view display 26' on device 24 while device 10 and device 24 are supported on user's wrist 72.

Figure 23:
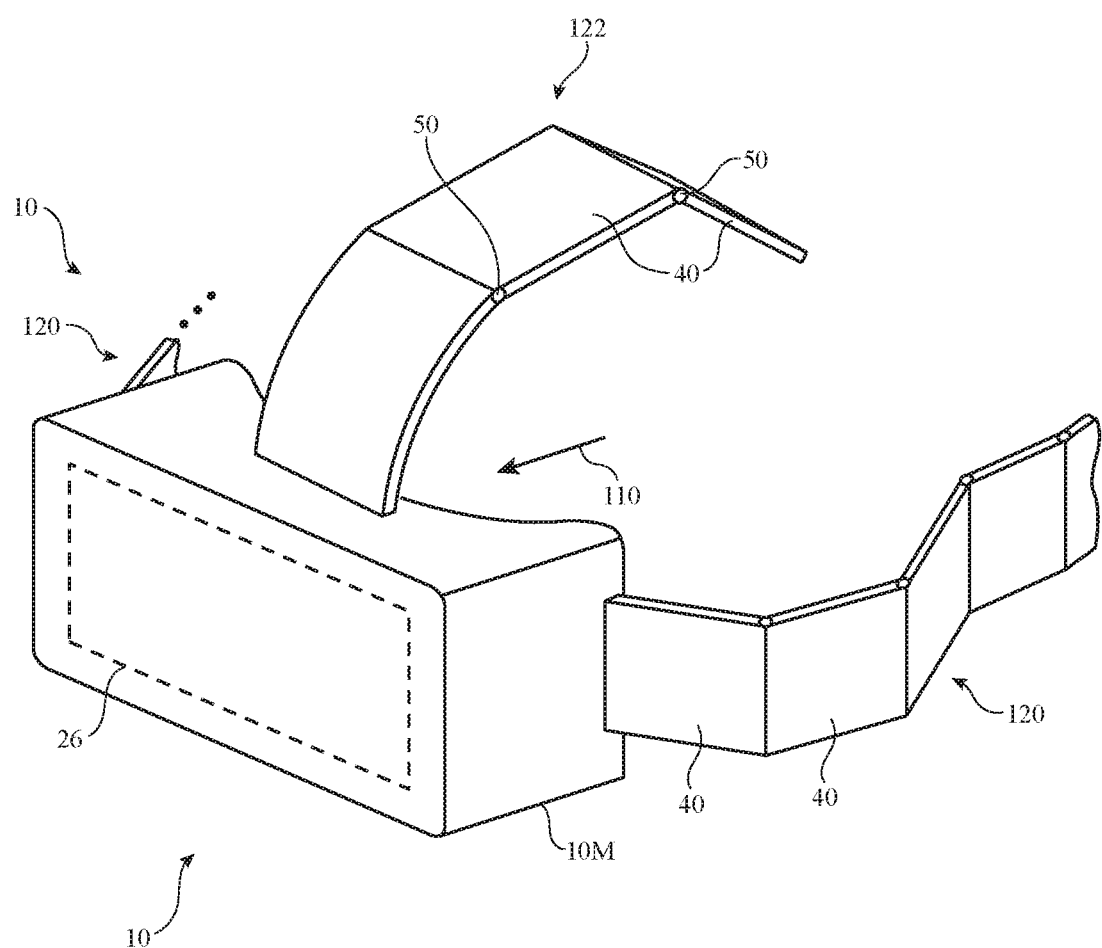
FIG. 23 is a perspective view of an illustrative head mounted device with hinged straps in accordance with an embodiment.
Figure 24:
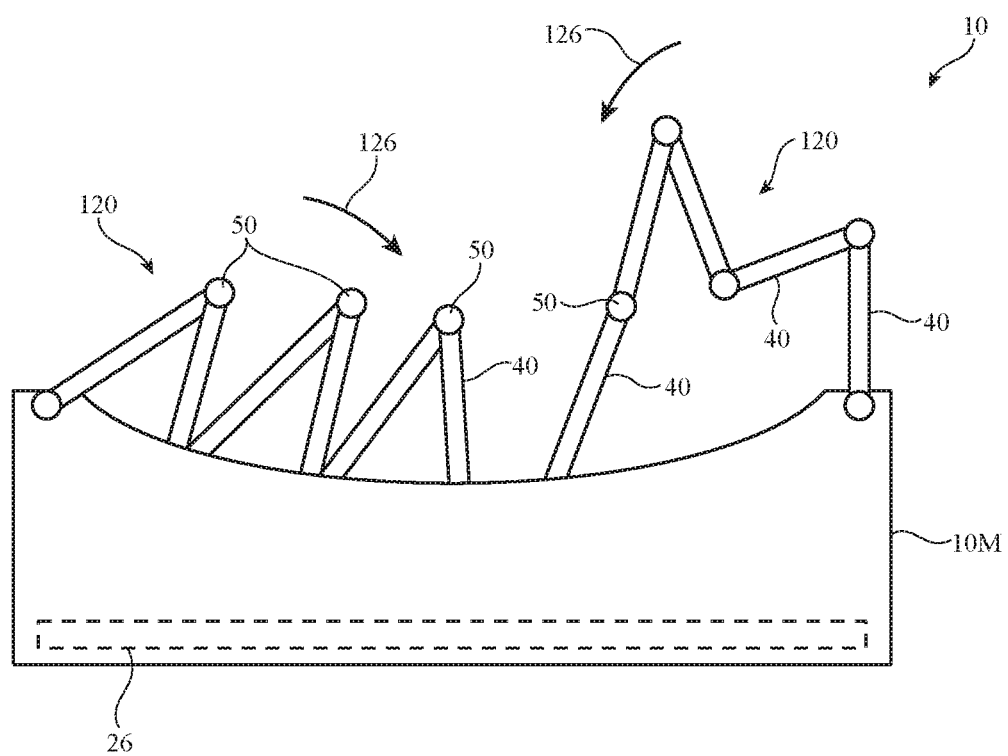
FIG. 24 is a side view of an illustrative head mounted device showing how hinged straps may be stowed within the housing of a main unit of the device in accordance with an embodiment.

As shown in FIG. 23, device 10 may be a head mounted device (e.g., googles, glasses, a helmet, and/or other device configured to be worn on a head of a user). While being worn, a user can view one or more internal displays such as display 26 in direction 110 (e.g., using lenses, waveguides, prisms, and/or other optical components to route light to a user's eyes). Display 26 may be mounted in a housing structure such as the housing forming main unit 10M of FIG. 23. Straps formed from members 40 and joints 50 (e.g., friction hinges, torsion spring hinges, freely rotating hinges, etc.) may be used in forming side straps 120 and/or top strap 122. FIG. 24 shows how a straps for a device such as head mounted device 10 may be folded for storage in an interior housing cavity formed from the housing walls of main unit 10M.

Figure 25:
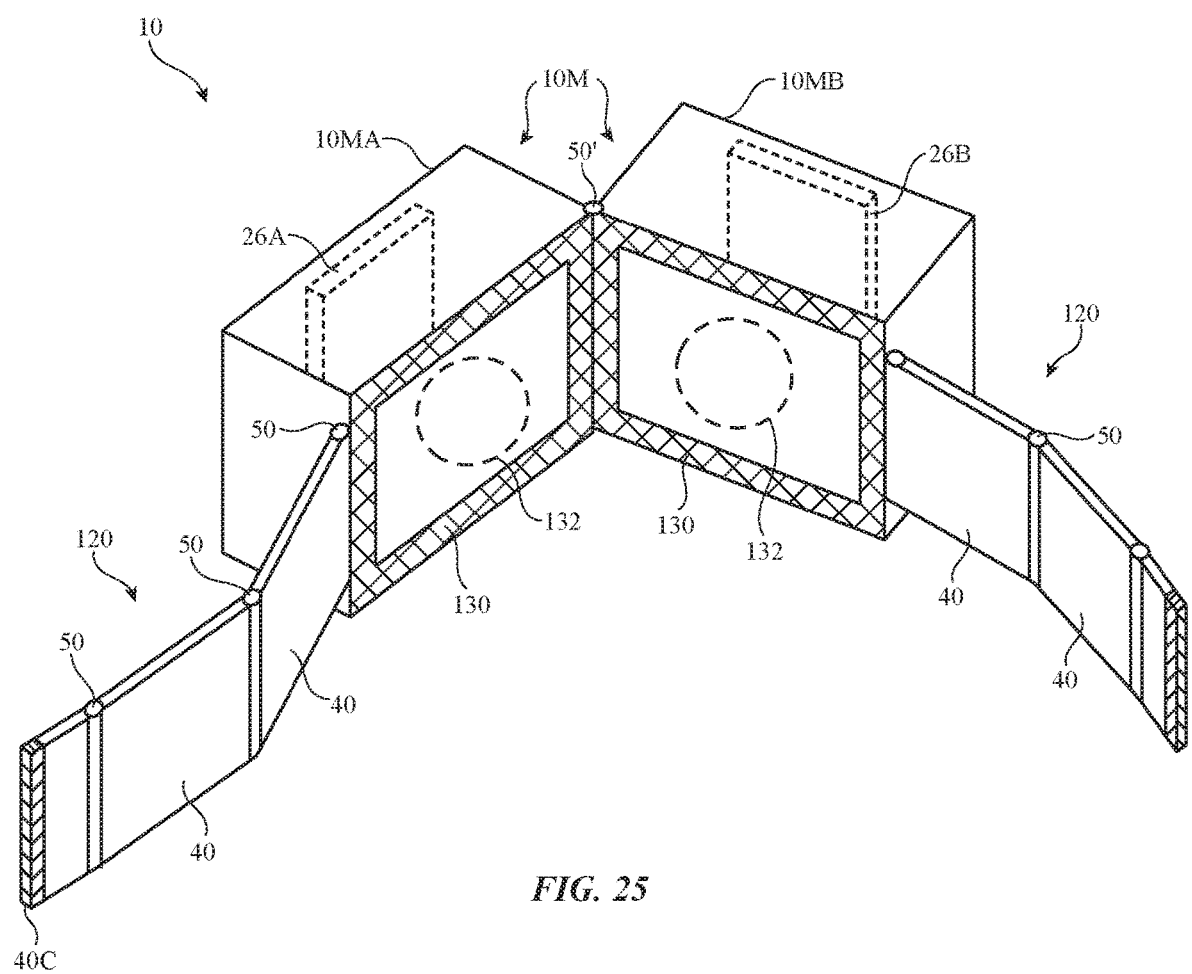
FIG. 25 is a perspective view of an illustrative head mounted device that may be folded on itself for storage in accordance with an embodiment.

In the illustrative configuration of device 10 that is show in FIG. 25, main unit 10M includes first main unit portion 10MA and second main unit portion 10MB. Portions 10MA and 10MB may be rotatably coupled using joint 50' (e.g., a friction hinge, spring-loaded hinge, freely rotating hinge, etc.) and can close for storage. Members 40 may form straps 120 that mount main unit 10M on a user's head and that fold when retracted into the interior portions of portions 10MA and 10MB. Joints 50 (e.g., friction hinges, spring-loaded hinges, freely rotating hinges, etc.) may be used in coupling adjacent members 40 to each other and may be used in coupling strap 120 to the housing of main unit 10M. Magnetic fasteners or other clasps 40C may be provided at the ends of straps 120. Lenses 132 and/or other optical components may be used to allow the user to view images on displays such as left display 26A and right display 26B. Rings 130 of pliable material (e.g., an elastomeric polymer or other soft that can conform to the shape of a user's face) may enhance user comfort as the inner edges of unit 10M rest against the face of the user.

The foregoing is merely illustrative and various modifications can be made to the described embodiments. The foregoing embodiments may be implemented individually or in any combination.

What is claimed is:

1. An electronic device, comprising:
 a first support structure having a first portion that rotates about a first axis;
 a second support structure having a second portion that rotates about a second axis;
 a friction hinge that joins the first and second support structures and that allows the first and second support structures to rotate relative to one another about a third axis, wherein the first and second support structures are configured to clamp onto a user's finger while being held in place on the finger by the friction hinge, wherein the friction hinge is configured to rest on a top portion of the finger, and wherein the first and second support structures extend only partially around a diameter of the user's finger;
 a sensor coupled to the first support structure; and
 control circuitry configured to gather input with the sensor.

2. The electronic device defined in claim 1 wherein the first and second support structures each include multiple ribs.

3. The electronic device defined in claim 2 further comprising support members having portions that pass through openings in the ribs and configured to allow the first and second support structures to twist along their lengths.

4. The electronic device defined in claim 1 further comprising:
 a haptic output device, wherein the control circuitry is configured to use the haptic output device to provide haptic output.

5. The electronic device defined in claim 4 further comprising wireless communications circuitry coupled to the control circuitry, wherein the control circuitry is configured to provide the haptic output with the haptic output device in response to detection of at least one of: (i) user input gathered with the sensor and (ii) information received with the wireless communications circuitry.

\* \* \* \* \*